United States Patent
Garyfalos et al.

(10) Patent No.: US 8,122,121 B2
(45) Date of Patent: Feb. 21, 2012

(54) EVENT NOTIFICATION OVER A COMMUNICATIONS NETWORK

(75) Inventors: Anargyros Garyfalos, Ipswich (GB);
Trevor Burbridge, Ipswich (GB);
Andrea Soppera, Ipswich (GB); Robert J Briscoe, Woodbridge (GB)

(73) Assignee: British Telecommunications PLC, London (GB)

( * ) Notice: Subject to any disclaimer, the term of this patent is extended or adjusted under 35 U.S.C. 154(b) by 2236 days.

(21) Appl. No.: 10/496,067

(22) PCT Filed: Nov. 25, 2002

(86) PCT No.: PCT/GB02/05310
§ 371 (c)(1),
(2), (4) Date: May 20, 2004

(87) PCT Pub. No.: WO03/051014
PCT Pub. Date: Jun. 19, 2003

(65) Prior Publication Data
US 2005/0013257 A1    Jan. 20, 2005

(30) Foreign Application Priority Data

Dec. 11, 2001 (EP) .................................... 01310355
Dec. 12, 2001 (GB) .................................... 0129712.6

(51) Int. Cl.
*G06F 15/173* (2006.01)

(52) U.S. Cl. ........................................ 709/224

(58) Field of Classification Search .................. 709/201, 709/223, 224
See application file for complete search history.

(56) References Cited

U.S. PATENT DOCUMENTS

| 6,073,184 A * | 6/2000 | Couturier et al. ............ 719/313 |
| 6,725,281 B1 * | 4/2004 | Zintel et al. .................. 719/318 |
| 6,970,925 B1 * | 11/2005 | Springmeyer et al. ........ 709/224 |
| 6,999,992 B1 * | 2/2006 | Deen et al. ................... 709/206 |
| 7,069,340 B1 * | 6/2006 | Evans et al. .................. 709/245 |
| 7,194,543 B2 * | 3/2007 | Robertson et al. ........... 709/226 |
| 7,319,673 B1 * | 1/2008 | Briscoe et al. ............... 370/252 |
| 2003/0051030 A1 * | 3/2003 | Clarke et al. ................. 709/224 |

FOREIGN PATENT DOCUMENTS

| EP | 0 876 029 | 11/1998 |
| EP | 0 984 586 | 3/2000 |
| EP | 1 130 845 | 9/2001 |

* cited by examiner

*Primary Examiner* — Krista Zele
*Assistant Examiner* — Esther Benoit
(74) *Attorney, Agent, or Firm* — Nixon & Vanderhye PC

(57) ABSTRACT

One or more users of a present state are notified of at least one property of an entity. A request message is received from a user over a first communications channel, the message containing information indicative of at least one property of an entity in which the user is interested. The present state of the at least one property is determined, as is an identifier of a second communications channel onto which future messages containing information relating to future changes of state of the at least one property of the entity will be transmitted. A reply message is transmitted to the user, the reply message containing information indicative of the present state of the at least one property and of the identifier of the second communications channel.

16 Claims, 9 Drawing Sheets

EVENT NOTIFICATION OVER A COMMUNICATIONS NETWORK

This application is the US national phase of international application PCT/GB02/05310 filed 25 Nov. 2002 which designated the U.S. and claims benefit of EP 01310355.1 and GB 0129712.6, dated 11 Dec. 2001 and 12 Dec. 2001, respectively, the entire content of which is hereby incorporated by reference.

BACKGROUND

1. Technical Field

The present invention relates to a method of event notification for use over a communications network, and more particularly to a method of event notification wherein an entity property state is communicated to a user simultaneously with a communications channel identifier for a channel where future changes of state of the property (events) will be announced.

2. Related Art

Event notification is the process of informing a number of user entities about some event in which they are interested. This event can be considered to be the act of a change of state.

Typically the state is located, or accessed, through a computing device that acts as a server of this state to interested clients. The request-reply paradigm is often used in computing to describe the synchronous access of a client to this state. The term synchronous is used because the request and reply form a single transaction with the client waiting for the reply from the server. Examples of this type of operation include access to web servers, file stores, databases, remote sensors, and even remote procedure calls to software objects or components.

Other forms of communication are considered to be asynchronous. The passing of messages or announcements from the server that generates them to the client is such a communication. The clients do not know when to expect such a communication, and can perform other tasks in the meantime. The server can be considered to be notifying the client about some change in state. Further announcements about state changes will continue to arrive without any action on the part of the client. Content distribution where information is pushed from the server to the client is similar. The difference between event notification and content distribution is perhaps only the timeliness of the messages. Event notification concerns clients that do not know when the next event notification will occur, whereas in some content distribution applications the content is streamed continuously. For example, in a video stream the client has a reasonable expectation of when the next video frame will arrive. Hence, event notification might be considered to be a sub category of content distribution, with different timeliness requirements. Content distribution can also differ from event notification in that content changes are sometimes only pushed as far as a local cache from where they are pulled by the client.

Asynchronous applications have a number of options as to when and what data they transmit, and how this arrives at the clients. Typically this is done using a publish-subscribe access paradigm. Clients subscribe to the server if they are interested, often giving their interest profiles. The server will then distribute information to those clients that are interested, until the clients tell them to stop.

Another other common method is to transmit continuously to some channel(s), and to let the clients decide what to listen to. A channel here is used to mean some identifiable communications feed to which the client can discretely listen. Since the number of channels is often limited by some physical resource, clients will often have to throw away unwanted information that also appears on the channel that it is monitoring.

Hybrid examples can also exist, as shown in FIG. 1. Here, the originating server 10 sends announcement messages to an intermediate message server 14 providing message queues to which end clients 12 can subscribe. Sending the message to a queue on the intermediate message server 14 can be considered similar to sending to a broadcast channel, while the clients still subscribe to the (intermediate) server. Similarly, when using multicast networks, the data is sent to a group identity, and the clients subscribe to the group by joining the multicast channel. In the Generic Announcement Protocol (GAP) described in our earlier co-pending International Patent application no. PCT/GB01/02681 filed Jun. 15, 2001 (U.S. Ser. No. 10/276,996 filed Nov. 20, 2002, now U.S. Pat. No. 7,400,625 issued Jul. 15, 2008), the clients subscribe to a local listener. This subscription to the notification communication channel can be considered different to the subscription to the server originating the notification. Unified technologies might back-propagate the communication channel subscription to the originating server(s). This is only possible where the subscription categorisation is shared between the communication channel and the originating server (such as in content classified messaging servers or caching content distribution networks).

PRIOR ART

Having discussed the general background to the invention, several specific examples of prior art will now be discussed.

1. LDAP (Lightweight Directory Access Protocol) Directory Client Synchronisation Keeping the client up to date has been a topic for discussion within the IETF (Internet Engineering Task Force) LDAP working groups for some years.

One of the early Internet Drafts is "LDAPv3 Triggered Search Control"<draft-ietf-ldapext-trigger-01.txt> of August 1998. This describes briefly a method where a search request is not answered immediately by the server. Instead the LDAP and underlying TCP connection is kept open until a change happens to the object referred to in the LDAP search. Another Internet Draft from Netscape also appeared in August 1998 describing a "Persistent Search: A Simple LDAP Change Notification"<draft-ietf-ldapext-psearch-01.txt>. This gives more detail, but is essentially the same technique.

This basic technique is implemented in recent directory servers including those provided by Microsoft and iPlanet (Netscape & Sun alliance). Here, the search is used merely to maintain the connection to the client and the notification of the object that is being watched. The connection is held open and the client effectively remains subscribed on the server while the connection is maintained. This wastes resources per persistent search for both the client and server. Also if the client or server fails, the operation is lost and must be repeated. This method is also clearly susceptible to denial of service attacks, and hence the number of persistent searches that any one client may place is limited (for example to 5 in Microsoft's Active Directory).

The LDAP techniques are limited to the LDAP protocol, and do not use a secondary communication channel to deliver asynchronous updates to the clients. Each LDAP client is notified separately of a change without the possibility to aggregate multiple requests into a single notification.

Recently a new working group has arrived at an "LDAP Client Update Protocol" (LCUP)<draft-ieft-ldup-lcup- 01.txt> presented in June 2001 (by Netscape and Microsoft). The new LDAP extension allows an operation where the client can synchronise data with the server, synchronise and persist the synchronisation, or persist only. It can also refer to sections of the directory tree rather than just single objects (or a container) as with the previous LDAP techniques mentioned. This new proposal is much more sophisticated than earlier drafts. It allows the server to intelligently disallow or disconnect persistent searches from high load or malicious clients. It also allows the client to continue with other LDAP operations over the same open connection to the directly without disrupting earlier persistent searches. This allows the server resources to be much more scaleable (to number of clients rather than number of operations).

Although the new LCUP protocol effectively allows a "lookup & watch" operation, similar to that to be described in respect of the present invention, it is constrained to LDAP directories. Furthermore LCUP does not allow the separation of the notification messages onto another communication channel, or the possibility to aggregate such notifications.

2. Oracle Database

Oracle software allows triggers to be loaded into a database. These are associated with items in the database and cause a small program to run in the database that allows more complex evaluations, and either the modification of other database values, or communication to external applications.

The triggers can be used by applications to set watches on database values, but each client application is in control of its own triggers with no scope for aggregation. The meaning of the return notification from the trigger, and the communication channel upon which it is delivered, are entirely open to the client application (since client and trigger are constructed by the same application developer in a capable programming language).

3. Message Queue Servers

A number of vendors produce message servers conforming to a number of message standards such as MSMQ, JMS or IBM MQ. Message queues are set up by an administrator on the message server, and clients subscribe to those message queues, as already described with respect to FIG. 1.

Such operation allows only a watch operation (via subscription to the intermediate message server) to be set on a data object to watch for future changes to the state thereof, but without any concept of a lookup of a present state of that object. This is not possible as the intermediate message servers do not cache the originating data server, and there is no communication directly between the clients and the originating server.

Furthermore, the message queuing architecture provides only an asynchronous message transport where the clients and originating servers share a communication infrastructure. They are not in direct communication, or necessarily aware of the identity of each other.

4. Content Delivery Networks

Where message servers provide only the watch operation upon defined content categories, content delivery networks (CDNs) provide the lookup function to the edge-of-the-network client. CDNs that use distributed caches may then subscribe the local cache to other network caches, and ultimately the originating servers. There is no communication between the client and the originating server. Hence the clients have to understand where to look for the data (perhaps by a DNS redirection or similar). The server transmits updates to the caches based upon back-propagated subscription information, rather than directly from client demand.

5. Operating System Event Notification

A number of schemes such as KQueue for FreeBSD by Jonathan Lemon provide for operating system events to be transmitted to applications. In KQueue the events can be such things as file system changes, process thread events or port communications. An application subscribing to one of these events has a queue set up for it where such events are held until the application retrieves them. The notification is queued before retrieval by the application, rather than being "pushed" to the application via notification by a communications medium.

6. Generic Announcement Protocol (GAP)

Finally, event notification is also the subject and intended use of BT's proprietary GAP technology, which is described in our earlier co-pending patent application no PCT/GB01/02681, as mentioned previously.

The Generic Announcement Protocol (GAP) consists of two types of announcements. The first type of announcement are those which are being listened for on behalf of a client application, and are termed secondary announcements. The second class of announcements are termed primary announcements and contain a payload which is related to one or more secondary announcements. GAP separates these separate primary announcements into index announcements and management announcements. Both index and management announcements are not destined for client using GAP, but instead are used by the GAP software layer itself to configure how it listens for secondary or data announcements. In effect these primary announcements are used to configure the GAP software layer.

Individual GAP announcements are considered to be part of an ongoing series of announcements. This series of related announcements is identified by a common Announcement Thread ID (or AThID), and is found in the announcement header. Typically the payload information in announcements with the same AThID will relate to the same item of data. For example they might be a series of updated tariffs for a particular service.

The announcement header also contains a version number that uniquely identifies announcements in a common thread. This version number serves a number of functions. As well as uniquely identifying an announcement, it also places the announcement in a time series and allows the detection of missing announcements.

The final part of the announcement header contains a GAP protocol version number and a number of flags that are available for GAP and higher level applications. One of these flags is used to indicate whether an announcement is a configuration announcement, and as such, should be dealt with differently to a data announcement.

With reference to FIG. 2, GAP operates as follows. Each announcement thread 21 is transmitted to one or more multicast network addresses). A software component termed the GAP announcer (not shown) handles the announcement of events to the multicast network, while another component called the GAP listener 25 is responsible for picking up announcements from the multicast network. The GAP listener acts on behalf of client applications 27 and monitors selected multicast groups for the required announcement threads.

The GAP listener 25 also maintains a list of available index channels 29 listing the announcement threads that it has been asked to watch. Whether the listener monitors the data announcement thread directly on a data channel 22, or utilises one of these indexes on an index channel 29, is intelligently decided upon by the listener. For example, one index channel 29 that mostly relates to announcement threads in which the listener is interested is likely to be worthwhile to listen to. Another index that only relates to one announcement thread of interest and a lot of high announcement volume threads in which we have no interest may not be so useful. By using indexes, the GAP listener can reduce the volume of announcements that it needs to receive, and also release multicast group resources that it uses to listen to the event announcements until those event announcements actually happen.

The GAP listener also receives configuration announcements over a management channel 24 that control its behaviour. These configuration announcements inform the listener about changes to announcement threads and related information, including the thread multicast location and available indexes.

It should therefore be apparent from the above detailed discussion of the prior art that event notification is of current interest, and there is a substantial amount of work in the field. However, both GAP and the other communication technologies mentioned concentrate on delivery announcements to clients that have already notified the communication technology of their interest. There is therefore still a gap in the field of event notification technology in the particular area of allowing clients to register their interest in a particular event thread, and of communicating to the client the necessary information required to allow the client to initiate a watch on a particular event thread.

BRIEF SUMMARY

In order to address the above, the present exemplary embodiment provides a combined "look-up and watch" method, which allows for clients to communicate directly with event servers to inform the servers of their interest in a particular object, and to obtain both the present state of the object from the server (the state "look-up"), as well as an indication as to where future changes of state (events) relating to the object will be announced (i.e. where the client should "watch" for future events) in a single reply message. The future changes of state are envisaged as being announced on another channel to that over which the client has made its request, and hence the indication will provide the identifier of another communications channel over which messages relating to future changes of state will be transmitted.

From a first aspect, according to the invention there is provided a method for notifying one or more users of a present state of at least one property of an entity, the method comprising the steps of:
  a) receiving a request message from a user over a first communications channel, the message containing information indicative of at least one property of an entity in which the user is interested;
  b) determining the present state of said at least one property;
  c) determining an identifier of a second communications channel onto which future messages containing information relating to future changes of state of the at least one property of the entity will be transmit; and
  d) transmitting a reply message to the user, the reply message containing information indicative of the present state of the at least one property and of the identifier of the second communications channel.

As will become apparent from the discussion of the embodiment, the "entity" of the present invention can be anything which may have some sort of property, parameter or characteristic which might change over time. For example, in one embodiment the "entity" may be a data object comprising one or more data structures and/or variables, the "property" of which may be a particular characteristic such as numeric value of one of the variables. In such a case the "entity" does not physically exist outside a computer system, and can be considered more virtual than real. In another embodiment the "entity" may be a specific physical entity such as a pressure gauge, the "property" of which in which the client is interested being the actual pressure measurement taken by the gauge. In such a case the "entity" is physically real, as is the property. The reader should therefore be aware that we envisage a broad application of the invention to almost any scenario where a property, characteristic, parameter or the like of an "entity", which may be either physically real or virtual, may change.

The present exemplary embodiment according to the first aspect provides numerous advantages. Firstly, it provides for the separation of the notification communication channel from the original request-reply medium, thus facilitating the use of bandwidth efficient indexing techniques such as those provided by GAP.

Furthermore, the direct access nature of the request from the client to the server removes the need for a central understanding and administration of content classification, as the client can simply directly request the property of the entity in which it is interested from the server.

Moreover, the receipt of the client requests directly at the server means that there is no need to propagate subscription information from notification communication medium to originating servers to control announcement generation, as the event server can simply register each look-up and watch request it receives to monitor client interest in a particular event thread.

Preferably, the determining step c) further comprises the steps of: mapping the requested property to one or more communications channels onto which future messages which indirectly relate to the state of the property will be transmit; wherein the or each identity of the one or more communications channels is used as the identifier. Such operation allows a flexible mapping of the requested property to future events to be announced, meaning that individual watches do not have to be maintained for every property of every entity. Instead, the identifier(s) of communications channels upon which future event announcements which encompass or otherwise relate to the change in state of the property can be sent to the client, who may then monitor these channels to achieve the same result of event notification.

From a second aspect, the invention also provides a method for determining the state of at least one property of an entity, the method comprising the steps of:
  a) transmitting a request message over a first communications channel to a server, the message containing information which indicates to the server the at least one property for which the state is to be determined;
  b) receiving a reply message from the server, the reply message containing information indicative of: the present state of the at least one property; and of: an identifier of a second communications channel onto which future messages containing information relating to future changes of state of the at least one property of the entity will be transmitted; and
  c) communicating the identifier of the second communications channel to a channel monitor arranged to monitor the channel for said future messages.

As with the first aspect, the reader should note the broad meaning envisaged for the "entity" and the "property" thereof, as described previously in respect of the first aspect.

From another aspect, the present invention also provides a computer readable storage medium storing a computer program which when run on a computer causes the computer to perform a method according to either one of the first or second aspects. The computer readable storage medium may be any suitable data storage device or medium known in the art, such as, as a non-limiting example, any of a magnetic disk, DVD, solid state memory, optical disc, magneto optical disc, or the like.

Furthermore, from a fourth aspect the present invention may also provide a computer system, which is further provided with a computer readable storage medium as defined by the third aspect.

Additionally, from a fifth aspect the invention also provides a system for notifying one or more users of a present state of at least one property of an entity, comprising:
 a) message receiving means for receiving a request message from a user over a first communications channel, the message containing information indicating at least one property of an entity in which the user is interested;
 b) processing means arranged in use to:
  i) determine the present state of said at least one property; and
  ii) determine an identifier of one or more second communications channels onto which future messages containing information relating to future changes of state of the at least one property of the entity will be transmitted; and
 c) message transmission means arranged in use to transmit a reply message to the user, the reply message containing information indicative of the present state of the at least one property and of the or each identifier of the one or more second communications channels.

Moreover, from a sixth aspect the invention provides a system for determining the state of at least one property of an entity, comprising:
 a) transmission means for transmitting a request message over a first communications channel to a server, the message containing information which indicates to the server the at least one property for which the state is to be determined;
 b) receiving means for receiving a reply message from the server, the reply message containing information indicative of: the present state of the at least one property; and of: an identifier of one or more second communications channels onto which future messages containing information relating to future changes of state of the at least one property of the entity will be transmitted; and
 c) means for communicating the identifier or identifiers of the one or more second communications channels to a channel monitor arranged to monitor the or each channel for said future messages.

The fifth and sixth aspects of the invention may further include the corresponding further features and advantages as already described in respect of the first and second aspects.

BRIEF DESCRIPTION OF THE DRAWINGS

Further features and advantages of the present invention will become apparent from the following description of embodiments thereof, presented by way of non-limiting example only, and by reference to the accompanying drawings, wherein like reference numerals refer to like parts, and wherein:—

DETAILED DESCRIPTION OF EXEMPLARY EMBODIMENTS

The invention is concerned with filling the gap in the event notification technologies as described previously through the provision of a combined "look-up and watch" operation. By "look-up" we mean the ability for a client computer to perform a request-reply operation with an event server to cause the server to look-up the present state or value of a particular property, characteristic, or parameter of an entity, and to communicate the present state back to the requesting client. By "watch" we mean the ability of the client to inform the event server of its own interest in the particular property, characteristic, or parameter and to find out the location where future announcements relating to changes (events) in the property will be transmit. The invention performs both of these operations in a combined request-reply operation directly between the client and the event server. The information thus gleaned by the client can then be used in an event messaging system such as is provided by the generic announcement protocol (GAP) discussed previously.

Description of the Embodiments

A first general embodiment of the invention will now be described with reference to FIGS. 3, 4, and 5.

We make the assumption that in a category of applications, the client will always want to know the current state of some information. Since the client will want to know this state on initialisation (for example, boot-up of a device), they will not want to wait for the next change of that state, which is an indeterminate time in the future (and possibly indefinitely). Hence they will use a request-reply communication to fetch the current state.

The lookup & watch operation provided by the present invention is an overloading of a request-reply operation in order to achieve the following functions for little additional cost:
 informing the client of which channel to monitor for announcements;
 informing the client of additional management information;
 informing the server of client interest.

Of course the lookup & watch operation also fulfils the request-reply requirement of fetching the requested data for which some search criteria was specified.

Figure 1:
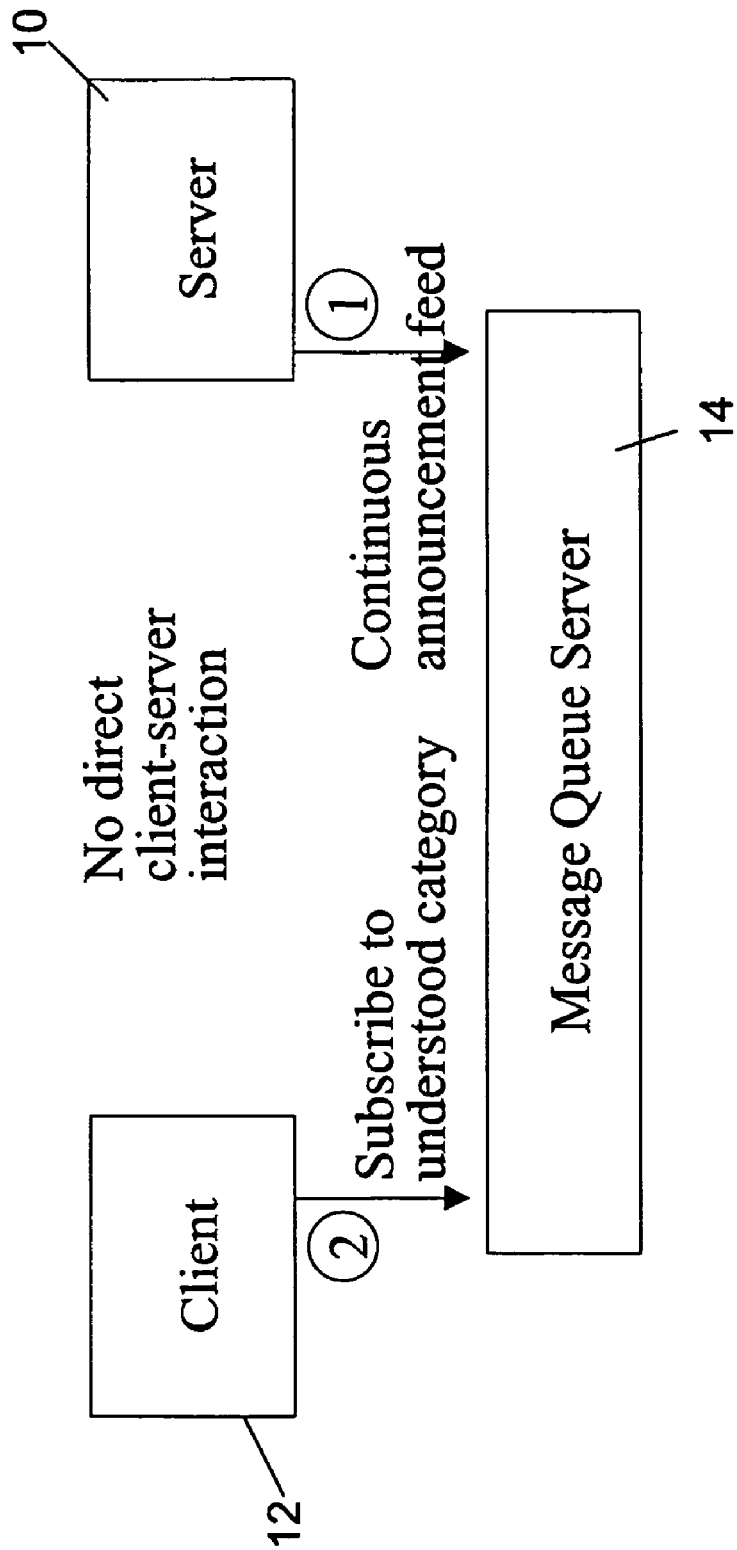
FIG. 1 illustrates a typical message queuing server of the prior art and its interactions with its clients.
Figure 2:
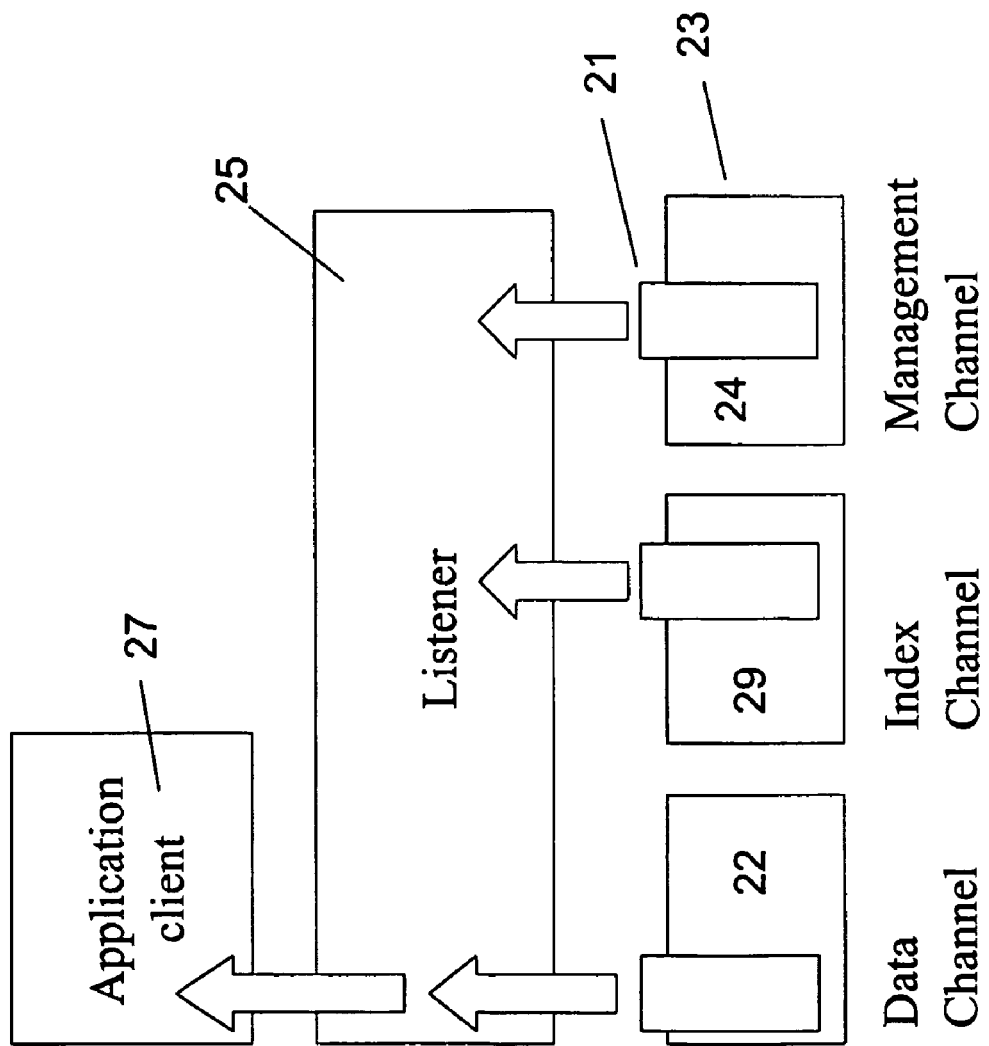
FIG. 2 is a block diagram showing the basic architecture of the GAP system as described in our earlier co-pending International patent application no. PCT/GB01/02681.
Figure 3:
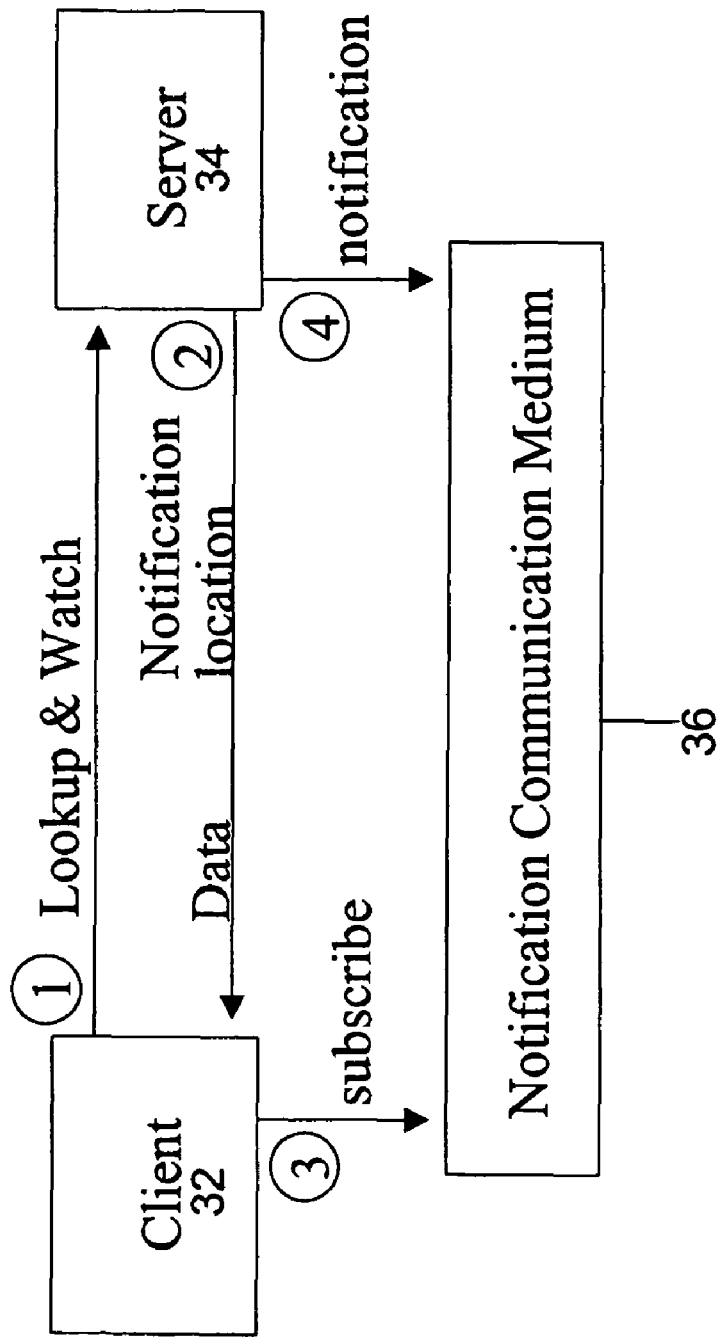
FIG. 3 is a block diagram showing the basic components and operation of the embodiments of the present invention.

As shown in FIG. 3, within the first embodiment of the invention a client 32 is arranged to communicate directly with an event server 34. By "client" and "server" herein we intend to mean both the actual computer hardware upon which the software which controls the embodiments is run, as well as the actual software application themselves. The nature of the client and server are discussed in detail later. It should be noted that the actual computer hardware itself may be conventional as is known in the art, and it is only once the hardware is provided with controlling software that the embodiments are realised. Each computer is of course provided with a processor, memory, operating system, and program and data storage means as is conventional.

In addition to the client 32 and the event server 34, a notification communication medium 36 is also provided, which serves to provide notification of future events relating to the property of the entity in which the client is interested. By "event" we mean, for example a change in state of the property, such as a change in the numerical value thereof. It should be noted, however, that the "event" may not simply relate to a single property of an entity, but might also be defined with respect to a group or class of entities or properties thereof. In addition, the "event" upon which the watch is to be set might relate to a future entity or property which is not yet in existence. An example of this would be where there exists a set of data objects in which the client is interested which all contain the letter "X", then a relevant event upon which a watch might be set could be the event of a new member being added to the set. In this case the new member does not exist at the time the watch is set, but it is possible to define a watch for this future event. There is therefore a flexible mapping between the actual state of a property of an entity which is looked-up in the look-up operation, and the future event relating to the property upon which a watch is to be set. The only real criteria that must be fulfilled is that the event somehow, but not necessarily directly, encompasses or otherwise relates to the looked-up property.

As will be seen later in the preferred embodiment, the notification communication medium 36 can be provided by a system such as GAP, for example.

The operation of the first embodiment of the invention is summarised as follows. At step 1, the client 32 transmits a look-up and watch request to the event server 34. The request contains information which identifies a particular property, characteristic, or parameter of an entity such as a data object or variable, and which is stored within the event server 34. Upon receipt of the request from the client, the event server matches the requested property with data it has stored in a data store, and should find an exact match. The server is preferably provided with some sort of search engine software to achieve this match. If no match is found then a null look-up return can be made to the client, but as will be seen later even when such a return is made, it may also be possible to return the communications channel identifier where future announcements of events relating to the requested property will be made.

Once the server has matched the request to a stored entity, it looks up the present state of the requested property of the entity, and buffers the read value in memory. Next, the server then checks to see if any client has requested the property previously, and this will be apparent if the property has a notification location associated therewith, the notification location being an identifier which identifies a communications channel or address where future announcements relating to changes in state (events) of the property will be announced. If such an identifier exists already, then this is also read and buffered into memory. If no such identifier exists then one is created, and stored in the server's data store associated with the property, as well as being buffered in memory. Preferably the identifiers are internet protocol multicast addresses.

As mentioned above, there can be a flexible mapping between the event which is to be announced on the communications channel identified by the retrieved identifier and the looked-up property in that the event does not have to relate directly to that property provided that it at least somehow encompasses or otherwise relates to the looked-up property. An example of this will make the point clearer. Consider a client application which obtains daily stock market prices on telecommunications stocks, which are held on the event server. Changes in all the listed stock prices are announced over a communications channel, which has an IP multicast address 123.456.789.012. Next, suppose a new telecommunications company, Boro Telecom (BT) has just become listed, and the client application sends a look-up and watch request to the event server to obtain the opening price of BT stock, and also to inform the server of its continued interest in the stock price. In its return message, the event server can provide the exact stock price of BT which has been requested, and provides the multicast address of the channel upon which any and all telecoms stock prices are announced. In this case the returned watch channel is of a coarser granularity than the requested property, in that it encompasses not just the property (price) of the entity (BT stock) requested, but also other properties of other entities.

It is also possible that the returned channel identifier could relate to one or more channels on which finer grained event announcements than the property requested by the client are made. For example, consider the same client application for telecoms stocks, but this time interested in a telecoms stock index value which is held on the event server. The client can perform the look-up and watch request for the index value, and the server might return the requested index value along with the identifiers of multiple communications channels upon which the changes in each individual stock price which make up the index value are announced, assuming that in future the client application can then directly calculate the index value from the individual stock price data. In such a case the returned watch channels each relate to information which is of a finer granularity than the requested property in that each when taken on their own do not give the index value, but when considered together are able to provide this information after suitable processing.

Therefore, the retrieved identifier can relate to a channel where future announcements directly relating to the requested property and no other will be made, or to one or more channels where future announcements relating to change events which encompass or otherwise relate to the looked-up property either in a broader or narrower manner will be made.

Once the server has obtained the requested information and buffered it into memory, the server composes a message in a known format, and places the buffered information relating to the present state of the property and the future notification location within the message at the appropriate points. Then, at step 2 the server transmits the message back to the client 32.

Upon receipt of the message at the client, the client reads the information relating to the present state of the property and the future notification location from the message. This information therefore provides the client both with the present value of the property which it may then use immediately, and also with the location where future event announcements relating to the property will be made. As the client required the present state information for itself, within the context of the invention nothing further is then done with this (although of course the client may use it immediately in whatever application to which the property relates). With respect to the notification location information, however, as the client relies upon the notification communication medium 36 to monitor for future event announcements, as step 3 the client passes the notification location information received from the event server to the medium 36, such that the client could be said to be "subscribed" to the medium. When changes of state occur to the property in the future, at step 4 the event server notifies the notification communication medium, which in turn then updates the client of the change.

The invention therefore provides a reliable and effective mechanism whereby a client might discover both the present value of the property of an object, as well as the location of future change announcements efficiently in a combined communication.

It will be apparent from the above that there are two main processes involved in the utilisation of the lookup & watch operation within a server of some description. The first is the process of accepting the lookup & watch operation from the client, setting the watch on the state concerned, and ensuring that the client has enough information to listen for event notifications concerning this state, as described briefly above. The second process occurs when the state in question changes, and the event notification is made. FIGS. 4 and 5 respectively show these processes in more detail, and these steps are described next.

Figure 4:
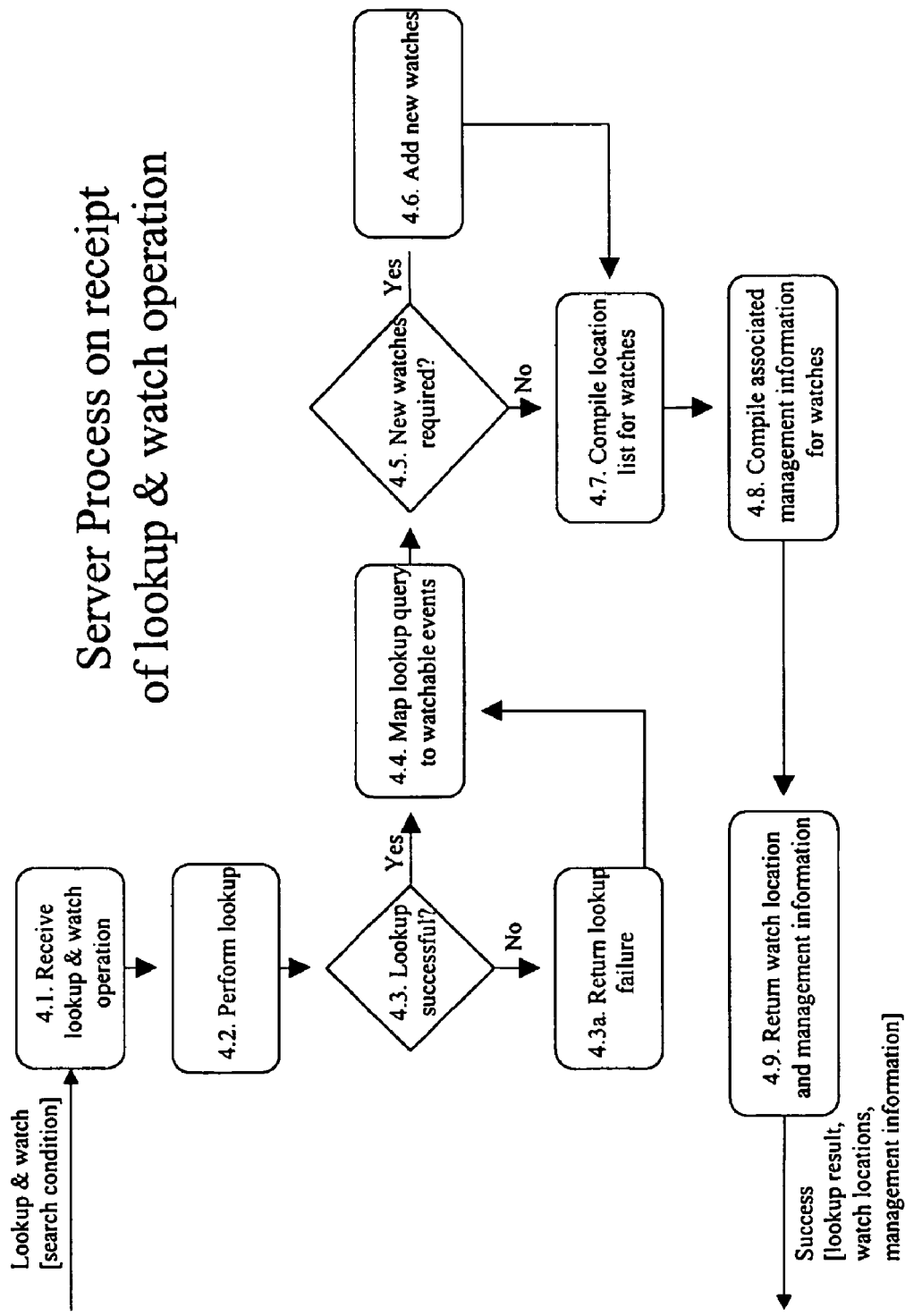
FIG. 4 is a flow diagram showing the steps performed by an event server upon receipt of a look-up and watch request within the first embodiment of the invention.
Figure 5:
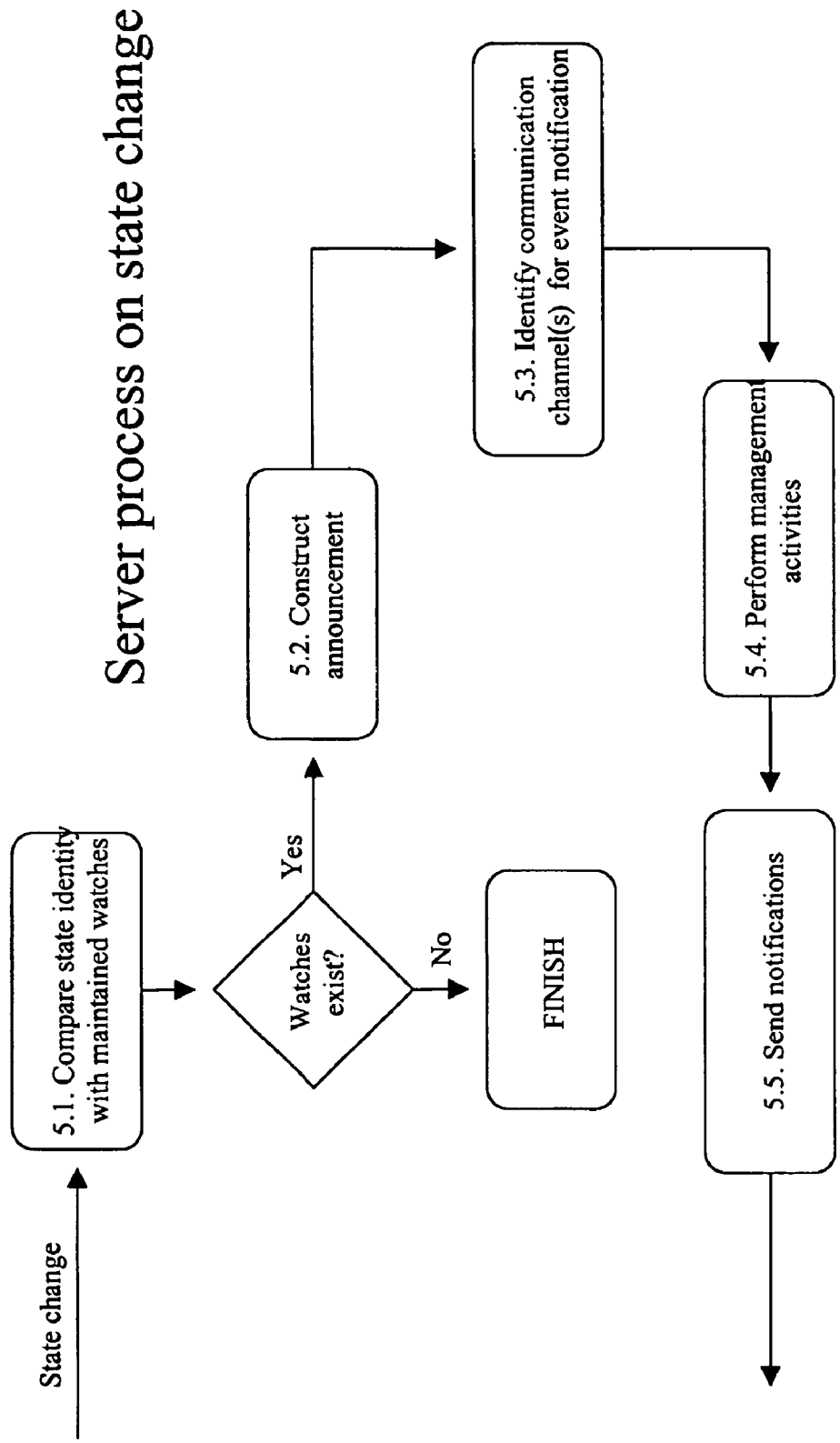
FIG. 5 is a flow diagram showing the steps performed by an event server upon a change of state of a property of an entity in the first embodiment.

FIG. 4 illustrates in more detail the general process steps performed by the event server on receipt of a look-up and watch request from the client.

At step 4.1 the server receives the lookup & watch operation request. The server needs to provide the interface for the lookup and watch operation from the client application. This interface is an extension of that normally used by the client in a request-reply operation to a server that does not provide the lookup & watch function. The lookup & watch parameters include the search condition usually found in the request-reply operation. Depending upon the protocol being extended, the lookup & watch operation may be a normal request-reply operation with additional parameters or switches in the request to tell the server that this is in fact a lookup & watch operation.

At step 4.2. the server performs the requested lookup. On receipt of the lookup & watch operation the server should perform the query using the specified search condition, as if performing a normal request-reply operation.

At step 4.3 an evaluation is performed to determine whether or not the look-up was successful. If it was not, for any reason, then processing proceeds to step 4.3(*a*), else it proceeds to step 4.4.

At step 4.3(*a*). the server aborts and returns a null lookup value if the look-up fails. A failure in the look-up operation could result from a number of reasons, such as the file-store being inaccessible, the search query being badly formatted. In the case of no results being found in response to the query, the server may also abort the entire operation, but it is also possible for a watch value still to be returned, even if the look-up returned a null. This depends upon the meaning of the watches being maintained by the server. If the watch is related to objects in existence, then no watches will be maintained for a null search result. However, the watch might be related to the search query itself rather than the objects returned. In this case a watch would be maintained for the search, and the event notification sent if any objects are created that meet the search conditions.

At step 4.4 the server maps the lookup query to any watchable events. If the search query is valid, then that query can be mapped onto a number of events (from zero upwards). How the search query is mapped onto events is extremely dependent upon the nature of the search protocol and the meaning of the data. In the case highlighted in step 3, where the event meaning is chosen to be directly related to the search, no mapping translation is required. As discussed earlier, however, the mapping can be flexible and the actual event for which the announcement channel identifier is returned does not have to relate exactly to the specific property and entity which as been requested, provided that it somehow encompasses or relates to the property in either a broader or narrower manner.

At steps 4.5 and 4.6 new watches are added if required. The event identities generated in translation from the search query need to be maintained in order to notify the events at a later time. Some, or all, of these event identities may relate to searches performed by previous clients. In this case the events are already being watched for. In the cases where event watches do no already exist, then these must be added to the list of currently maintained watches.

At step 4.7 a list of communication locations for watch(es) is compiled. For each event identified in relation to the search query, the server needs to assemble the information on how that event is disseminated. Typically each event might have an identifier on a communication channel. The list of these events and their locations needs to be assembled in order to return them to the client application, so that the client can monitor for them.

At step 4.8 associated management information required is also compiled. Along with the locations of the event notifications, there may be additional information that is used to manage access to the event notifications on their respective communication channels. Examples of this are how to obtain information about changes to that event notification such as the channel it is on. Alternatively it might include indexing information to enable the client to reduce the overhead of watching for event notifications, or security information so that the client can authenticate event notifications when they arrive.

At step 4.9. the results from the preceding operations are returned to the client. The data resulting from the search condition is returned to the client, along with the associated event information (and management information relating to those events).

The above summarises the process steps required by the look-up and watch operation provided by the present invention. Such an operation is, however, a precursor to an actual future change event i.e. when the particular property of the entity for which the watch has been set using the look-up and watch operation changes. The process steps performed by the event server when a state change occurs are shown in FIG. 5, and described next.

At step 5.1, upon the event of a state change, the state identity is compared with any maintained watches. The process starts with some state change on the data for which the server is responsible for access. This could be a change in some sensor reading, or a change in a database value resulting from a write operation by a client application. The server needs to determine whether any existing watches relate to the state change effected. If there are no watches existing for that state, then no action is necessary since there are no clients who are interested in receiving the notification. If watches do exist then processing proceeds to step 5.2.

At step 5.2, the event change announcement(s) are constructed. For each watch covering the item of state, the server needs to construct a message that will inform the clients of the change. Often only one announcement will be constructed for an atomic state change. However, it is possible for multiple watches to relate to the same item of state (when at least one watch covers more than just this single item). In this case, the event notifications for the two different watches may contain different announcement messages. Alternatively if the message meaning is related to the data change, then multiple event announcements might share the same announcement message. The actual construction of the announcement messages will depend upon the event notification technology involved, and an example using the GAP system will be described later.

At step 5.3 the server identifies the communication channels for the event notification. The server has to identify where to send each of the event notifications. This task can be split between the server and the underlying communication manager, but must correspond to the location of the communication channel that was told to the client during the lookup & watch operation.

At step 5.4 the server performs any required management activities. Which, if any, management activities are performed at this stage vary depending upon the application, and the communication technology used for the event notification. In communication technologies which utilise indexing, one such management task will be the announcement of such indexes, or at least the notification to such parties who perform the indexing.

Finally, at step 5.5 the server transmits the notification messages to the appropriate communications channels which were previously identified to the clients during their respective look-up and watch operations. The constructed announcements concerning the change of state are delivered to the communication channels (to which the interested clients are listening).

Having described the basic operation of the present invention, further details relating to both the client and server will now be described, in that order, which may be used to provide further embodiments of the invention.

With respect to the client, there is very little restriction on what types of client application might use the lookup & watch operation of the invention. For example the client might be a network router operating system, or a business workflow application, or a manufacturing plant control system. It can be just about any application which needs to be informed about changes to some parameters in a timely and resource efficient manner.

The client can be defined by its use of two interfaces. The first of these is the application programming interface (API) to the event announcement distribution channel (i.e the notification communication medium 36 in the first embodiment). This interface is used by the client application to listen for forthcoming announcements about changes of state for data that it has previously performed a lookup & watch operation. The second interface is to the event server for the lookup & watch operation itself. Again, like the application client, the exact application that is performing as the server for the lookup & watch operation can differ widely. For example it might be a database or an LDAP directory. Alternatively it might be a remote autonomous heat sensor, or an item of plant equipment.

Although we have stated that the applications performing as the client and event notification server can vary widely, the interaction between them must be capable of performing the lookup & watch operation. There is no restriction on the physical medium, or on the network protocol, or even on the application protocol which is used. This, for example, might be HTTP or LDAP or any other number of standard protocols. It might also be a proprietary interface, or a remote procedure call in a distributed computing technology using CORBA, Java RMI or SOAP. What it must involve is some form of synchronous lookup using some search criteria, by which the client is expecting a return of some data. Within the invention this lookup operation must be extendable to the lookup & watch operation, where the client also expects notification of the location of any changes to the queried state to be announced later. A standard request-reply protocol may be extended in a number of ways to provide the functionality required by the invention. For example, some protocols, such as LDAP, allow additional operations to be defined. Others can use additional control operands or parameters to notify the server that the client is interested in setting a watch on that data.

Along with the data returned from the lookup request, the client will also be returned information on where to monitor update announcements. Depending upon the transmission technology this might be a content category in a message queuing server or an announcement thread identity on a multicast channel using the Generic Announcement Protocol.

Furthermore, as mentioned previously, depending upon the complexity of the lookup search criteria, the client might not receive back one announcement channel which exactly matches its request. Instead the search request might be matched to a number of smaller watches, or higher level watches that encompass the client request. An example of this is an SQL access to a database to retrieve a number of rows. Each row has an individual watch, and announcement channel, set upon it. Instead, the request might be served by setting a single watch on the entire table. The granularity of event announcements for data updates is at the discretion of the server handling the lookup & watch operation. Of course, the client must be expecting data to have a certain meaning, or be able to determine the meaning based upon the return of the data from the server.

Additionally the client might also be returned additional management information relating to the watches which it has set. This extra data might perform a wide range of functions depending upon the transmission method for the event announcement. Examples of how this information might be used for the Generic Announcement Protocol are described later in respect of the preferred embodiment.

Turning now to a consideration of the event server, the event notification server that handles the lookup & watch operation should partition the data/event space into a meaningful structure. Each part of this structured space can be used in reply to a search request, and can also be the subject of an event announcement should its value change. The granularity of such a structure greatly depends upon the capabilities of the search protocol used in the lookup & watch. For example an SQL search can return individual fields, while LDAP returns more coarse granular objects. At the highest level the server will not have any search criteria and will respond with a single item of state which encapsulates everything in its data structure. This particularly applies for small servers such as a temperature sensor. It should be noted that the granularity (and even the structure) of the event announcement meaning does not have to exactly match the granularity of the data being returned in response to the lookup search criteria. For example, the search might return a database table row, but the event announcements might be associated with the finer grained fields, or the coarser table.

Dependent upon the type of application for which the invention is being used the partition of the data/events is likely to have already been agreed and understood by the client base for that event notification server. For example, a client of an LDAP directory can expect to be able to express interest in a unique DN, and receive an announcement channel to watch for changes to that directory entry. It will know that it cannot express interest in only an individual attribute, or all entries in an entire sub-tree of the directory (except by monitoring multiple announcement channels).

Some applications might allow event announcements to be assigned at different levels in the structure (e.g. changes to a row in a database, or an entire table), in which case the client must understand what each event announcement relates to and deal with them appropriately.

It is also possible that not only the granularity, but also the data structure might differ between the lookup search, and the event announcement. For example, an event might be delivered in a category classification on a message queue where the classification has no meaning in the normal searchable data structure. Again the clients would need to be intelligent enough to understand and deal with the different meanings of different event announcements received from that channel.

A preferred embodiment of the invention will now be described which makes use of the GAP system described in PCT/GB01/02681 (publication number WO01/99348) as the notification communication medium. The parts of the GAP system required for understanding the present invention were described previously, but in case further clarification is required the reader is hereby referred to our earlier application as numbered above, and in particular to pages 9 to 20 and the Figures referred to therein, the disclosure of which is hereby incorporated herein by reference.

Within the preferred embodiment we use GAP as the communication layer to distribute event notifications efficiently, to any number of clients who are interested. In comparison to various media streaming services, the announcement servers will only distribute events that clients have previously expressed an interest in by their use of the lookup & watch operation.

The interaction between the client and the event notification server during the lookup & watch operation is crucial as it provides the means for a client to express an interest in events, and also provides the means of informing the client (and thereby its GAP listener) about the AThID and multicast address for those events. Additionally this communication can also provide the client with indexing information, and potentially the location of associated configuration announcements should these be delivered on a different channel to the event notification to which they relate.

Figure 6:
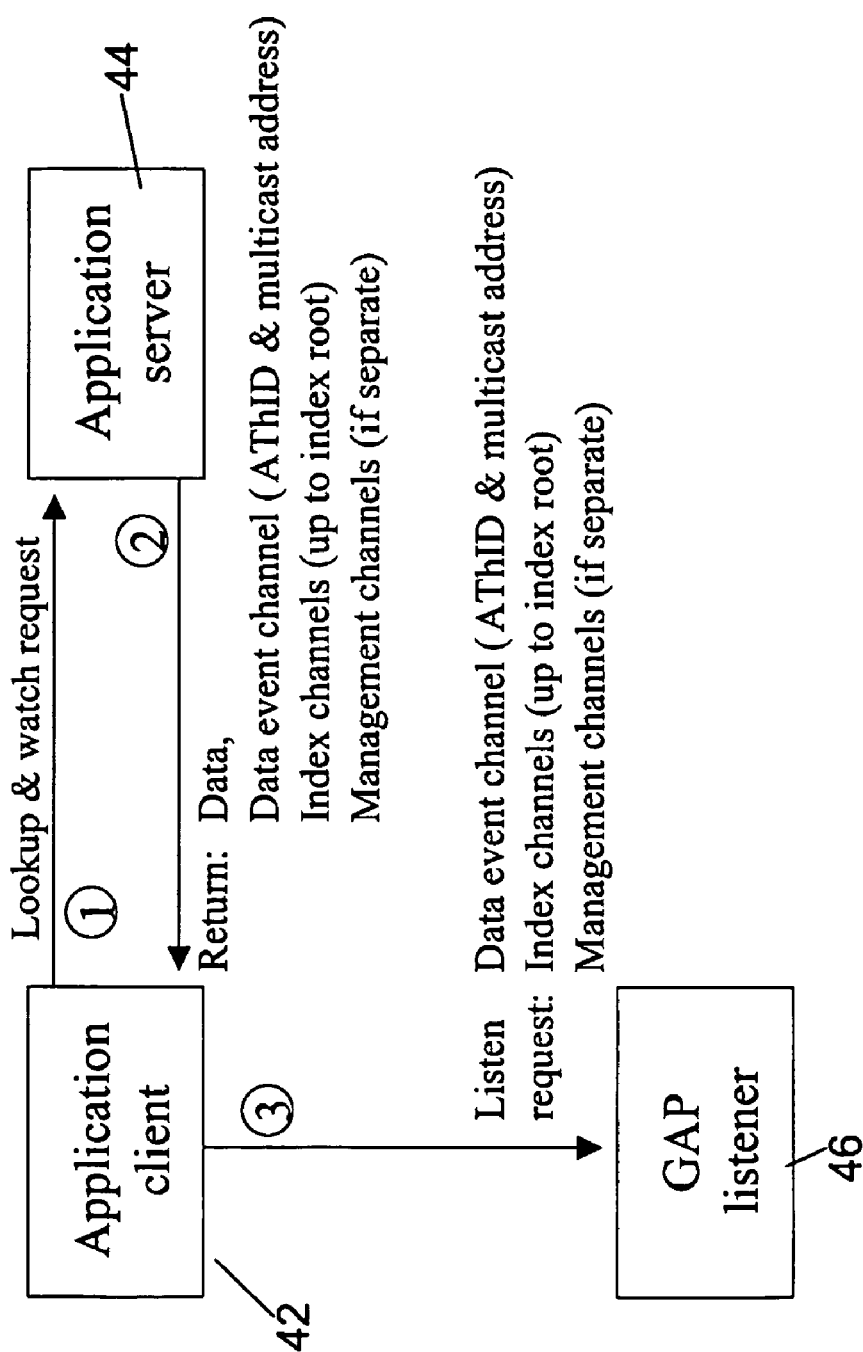
FIG. 6 is a block diagram showing the components and operation of a preferred embodiment of the invention.
Figure 7:
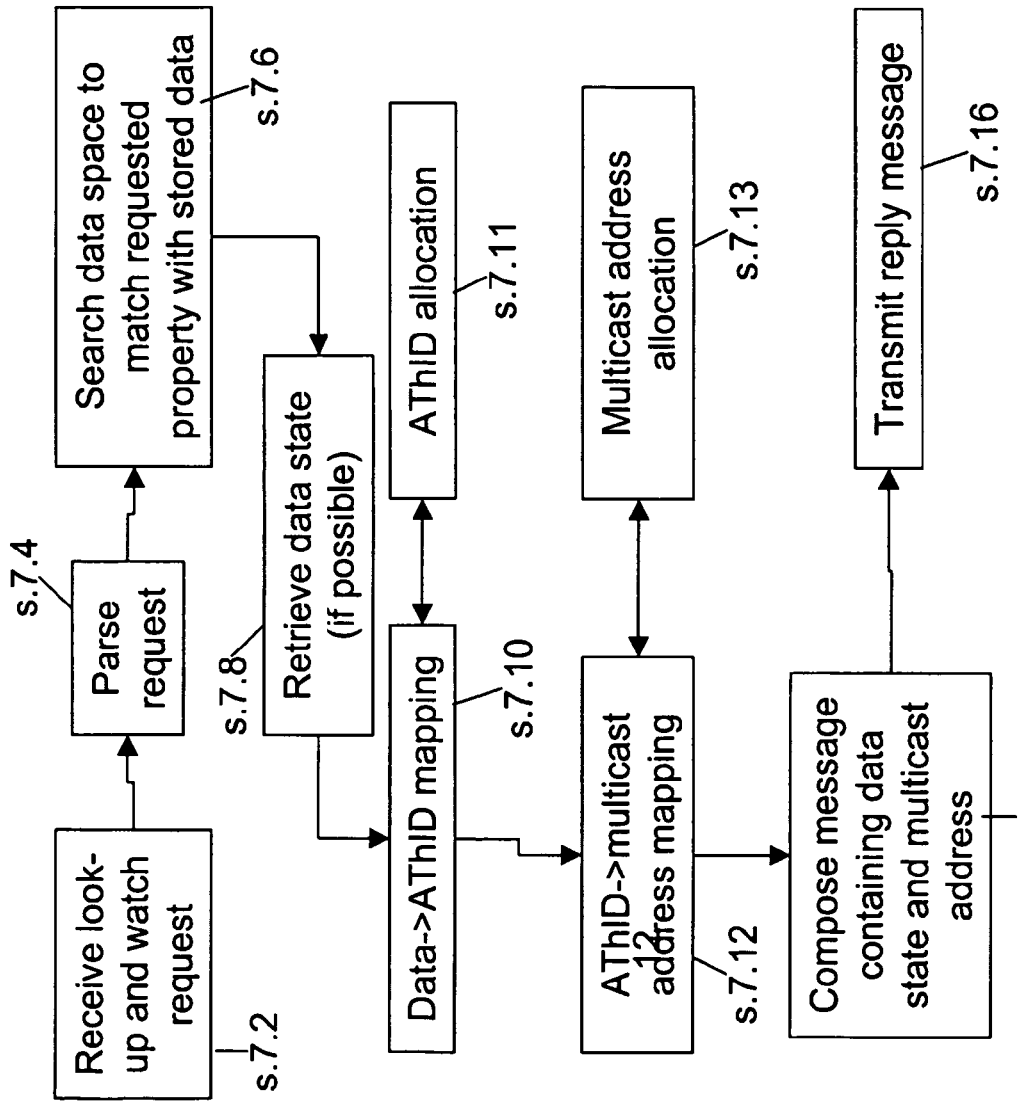
FIG. 7 is a flow diagram showing the steps performed by an event server upon receipt of a look-up and watch request within the preferred embodiment of the invention.

FIGS. 6 and 7 respectively illustrate the elements of the preferred embodiment, and a flow chart showing the steps taken by the event server upon receipt of a look-up and watch request.

In FIG. 6, an application client 42 is provided, being a software application being run on a conventional computer (not shown). The application client 42 requires for its operation a property such as the value of an entity such as a data variable which is stored by an application server 44. The application server 44 is also a software application being run on a conventional computer (not shown).

Both the application client and the application server are arranged to use the GAP system as previously mentioned and referenced for event notification (i.e changes in the property in which the client is interested) but the GAP system does not define how a client can initially know about an announcement so that it may then ask the GAP listener to listen for it. In order to provide this functionality, the preferred embodiment of the present invention provides a lookup and watch operation optimised for GAP. Using the lookup & watch operation, clients can express an interest in certain data items or events. When these events happen (such as a change in state of a data item), the clients are immediately informed by an event announcement delivered by GAP.

Clients will typically want to retrieve the current state of an item at the same time as requesting notification on future changes. We therefore combine both of these actions into a lookup & watch operation for efficiency. This does not preclude the use of discrete lookup requests or the setting of an event watch without retrieving data. These can both be atomic actions available to clients. The 'watch' part of any request made from the application client to the server will return an AThID and multicast address to the client. The application client can then ask it's local GAP listener to monitor this event feed on its behalf.

Minimally, the event announcement location is the only information that the client needs in response to the watch part of a lookup & watch operation. Other information which is used by GAP (such as the availability of indexes, or configuration requests) can be delivered via GAP on the AThID and multicast location of the event being monitored, and to which this additional information refers.

In order to perform a look-up and watch operation in the preferred embodiment, at step 1 in FIG. 6 the application client 42 transmits a lookup and watch request to the application server, specifying the entity and the property of the entity in which it is interested. In many applications the definition of the entities and their properties will have been agreed in advance between the application client and the application server.

Once the request has been received at the server, the server performs the steps shown in FIG. 7 in order to generate a reply to be sent back to the client. These are described in more detail next.

Firstly, at step 7.2 the server receives the look-up and watch request message. This message will be in a known format such that the server knows which part of the message relate to various items, and in particular which part or parts specifies the entity and the property in which the client is interested. Therefore, using this knowledge of the message layout, at step 7.4 the server parses the received message to extract the clients specification of the data in which it is interested.

Having extracted this information, at step 7.6 the server searches through its data store in an attempt to match the requested data with data it has stored therein. If this is possible then the stored data is read directly from the data store. If this is not possible then the server will return a null look-up value, and may abort the entire operation. Alternatively, depending on the application context it may be possible for the server to return the null-look-up value to the client, but accompanied by a watch channel address relating to an event which in the future may produce a state change in the requested property. This may be applicable where, for example the requested entity property does not yet exist because the entity has not yet come into being, but may do in the future.

At step 7.8 if the data has been matched the state of the matched data is read from the data store for inclusion in the reply message to be sent to the client as the present state of the entity property requested by the client. Following this, at step 7.10 a check is made to see if the data matched to the request already has an associated Announcement Thread ID (AThID) (i.e. has it been requested before), and if so then this is also retrieved. If there is no AThID then processing diverts to step 7.11, wherein an AThID is allocated to the data. The GAP specification does not include the allocation of the announcement thread ID (AThID), version number, or the construction of the payload. These functions are left to application components above the GAP layer, which in this case is the event notification system.

The AThID retrieved or generated for the data is effectively part of the channel identifier over which future event announcements which may affect the looked up property will be made. As discussed in respect of the first embodiment, there does not have to be an exact mapping of the AThID to the particular property looked-up, provided that the events identified by the AThID somehow encompass or otherwise relate to the property.

Once an AThID has been obtained for the data, at step 7.12 this AThID is mapped to a multicast address which is used as the identifier of the communications channel on which future event announcements relating to the data will be made. In GAP, many individual AThIDs can be mapped to a single multi-cast address. If the AThID for the matched data has only just been created at step 7.11, then the processing diverts to step 7.12 for the AThID to be mapped to a particular multi-cast address. This allocation may map the AThID to an existing multi-cast address which is already being used for other AThIDs belonging to other data, or may be a new multi-cast address chosen from the range of multi-cast addresses pre-allocated to the event server.

The choice of which multicast address to use may be under the control of the application. This allows the application to group AThIDs onto the same channel where they have similar meaning and are likely to be listened to by the same clients. This can only be done if the application either has knowledge of the clients' listening behaviour, or has knowledge of the structure and meaning of the events that it is producing. Alternatively, other parties may take the role of assigning the announcement threads to multicast addresses in order to optimise the multicast address use between applications.

Once a multi-cast address has been obtained, at step 7.14 the server composes a reply message to the client, the message being in a pre-determined format which will be understood by the client and containing fields containing data indicative of the read state of the requested data, the multicast address of the channel onto which future change announcements will be transmitted, and the announcement thread ID relating to the looked-up data. Once the message has been composed, at step 7.16 the server transmits the message back to the client application. This concludes the basic look-up and watch operation of the present invention using GAP.

In any GAP system, however, additional optional components can also perform functions such as automatic indexing independently of the application generating the event announcements. These functions are contained within the GAP announcer and other associated GAP components.

If the indexes are visible to the event notification server, then available indexes can also be passed to the client application performing the lookup & watch operation in the reply message from the event server. In GAP, these index details will need to be passed to the client's GAP listener so that the listener can choose whether to utilise those indexes in its overall listening pattern.

The index announcements are GAP announcements, and as such, require an AThID and multicast address for each index, and these AThIDs and multicast addresses would need to be included in the look-up and watch reply message. Where the index structure is more than one level (i.e. index announcement threads index other index announcement threads), then the complete index tree above each event notification announcement thread can be returned to the client.

In addition to the currently available indexes, additional information, associated with that event feed, might also be returned to the client in the reply message. One example of this might be the lifetime over which that event feed will be valid.

When an event happens that is related to an assigned AThID, information about the event is placed into the payload of the GAP announcement. The version number is incremented and the announcement is handed to the GAP announcer for distribution.

As mentioned previously, it should be noted that the granularity of what is to be considered an event (with a respective AThID) depends upon the nature of the event notification application. For example, an event could be related to a change in a single field of a database table, or a single row, or any change in the table. More intelligent applications might allow the granularity of events to vary to match the varying granularity of requests from the clients. Note that they could well not vary the meaning of an event, and instead return a large number of smaller component events in response to one client request.

Applications might even attempt to combine more granular events in an attempt to reduce the number of AThIDs that they manage. In such cases they should be aware that this may place a higher load on the network since the combined event is happening as often as the sum of the component events, but the payload describing the event is liable to be larger (since it has to refer to sub-parts). Network load near the GAP listeners will be higher since the span of the multicast tree will be increased to include listeners that are not ultimately interested in some announcements. Also listeners and application clients only interested in one part of the combined event are subjected to a higher processing load than necessary.

A third specific embodiment will now be described which uses GAP as the notification medium, and a Lightweight Directory Access Protocol (LDAP) directory as the means in which the data which is subject to change is stored.

Figure 8:
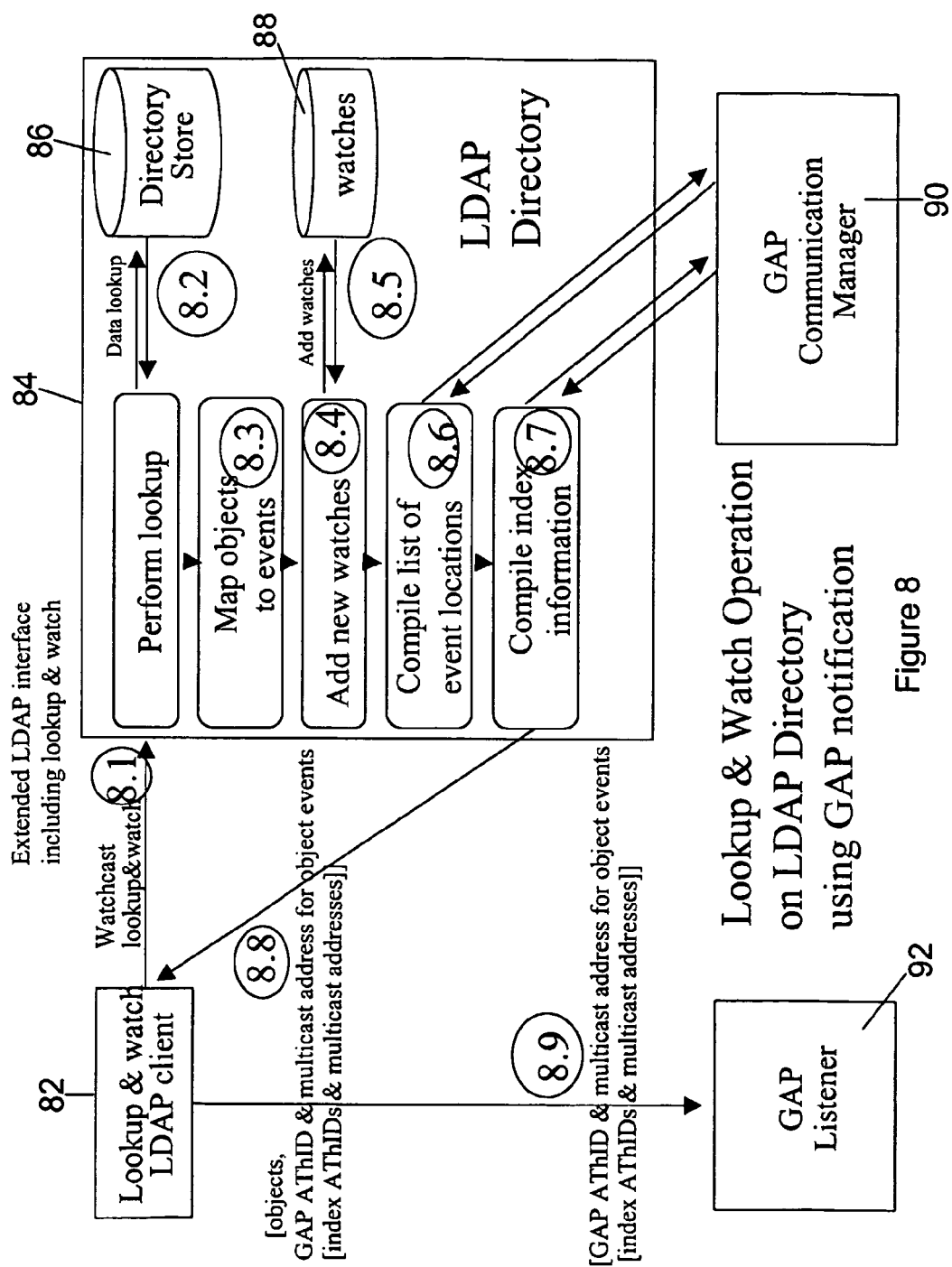
FIG. 8 is a block diagram showing the components and actions taken by a third specific embodiment of the invention using GAP notification with an LDAP directory.

FIG. 8 illustrates the components involved and shows the flows of signals therebetween in the third embodiment when performing a look-up and watch operation.

At step 8.1, the LDAP client application 82 transmits an extended look-up and watch request, and this is received at the LDAP server 84. Upon receipt of the request at the server, the server uses the information to execute a normal LDAP query against a directory store 86 at step 8.2, and the objects concerned are thus retrieved from the directory store 86. This corresponds to the "look-up" operation of the invention.

If the directory search fails for some reason, and the query is ill-formed, or no objects are returned, then the lookup & watch operation may terminate, and the client is informed of such.

At step 8.3, for each object returned in response to the LDAP query, an associated event is identified (in a simple 1:1 mapping in this case i.e. there is no flexibility in the event mapping as was the case in the first and second embodiments). Then, at step 8.4 a check is made to see if any previous watch requests have been received for the object by checking a watch store 88. Any object DNs returned by the query that are not already in the watch list are added to the watch store at step 8.5.

At step 8.6 a list of communication locations for watch(es) is compiled. In conjunction with the GAP communication manager 90, the LDAP server identifies an Announcement Thread ID (AThID) and multicast channel on which forthcoming event notifications about each object will be sent. Although each object DN has it's own AThID, multicast addresses will be shared.

At step 8.7 the LDAP server compiles associated management information. In conjunction with the GAP communication manager 90, the server compiles a list of index channels (AThIDs & multicast addresses) of index announcements which will refer to the event notifications when they occur. Recursively, index channels that refer to other index channels will also be included in the list.

At step 8.8 the objects returned from the LDAP query are returned to the client, along with GAP channel information on where to find event notifications relating to each of the objects. Also returned is the tree of available indexes. All of this information is returned to the client in a reply message.

Finally, at step 8.9 the information about the GAP channels and indexes is passed from the client application to a GAP listener 92. The GAP listener then monitors the index channel on behalf of the client for the appropriate AThID and version number which will be used to signal future event notifications, as described in GAP.

Figure 9:
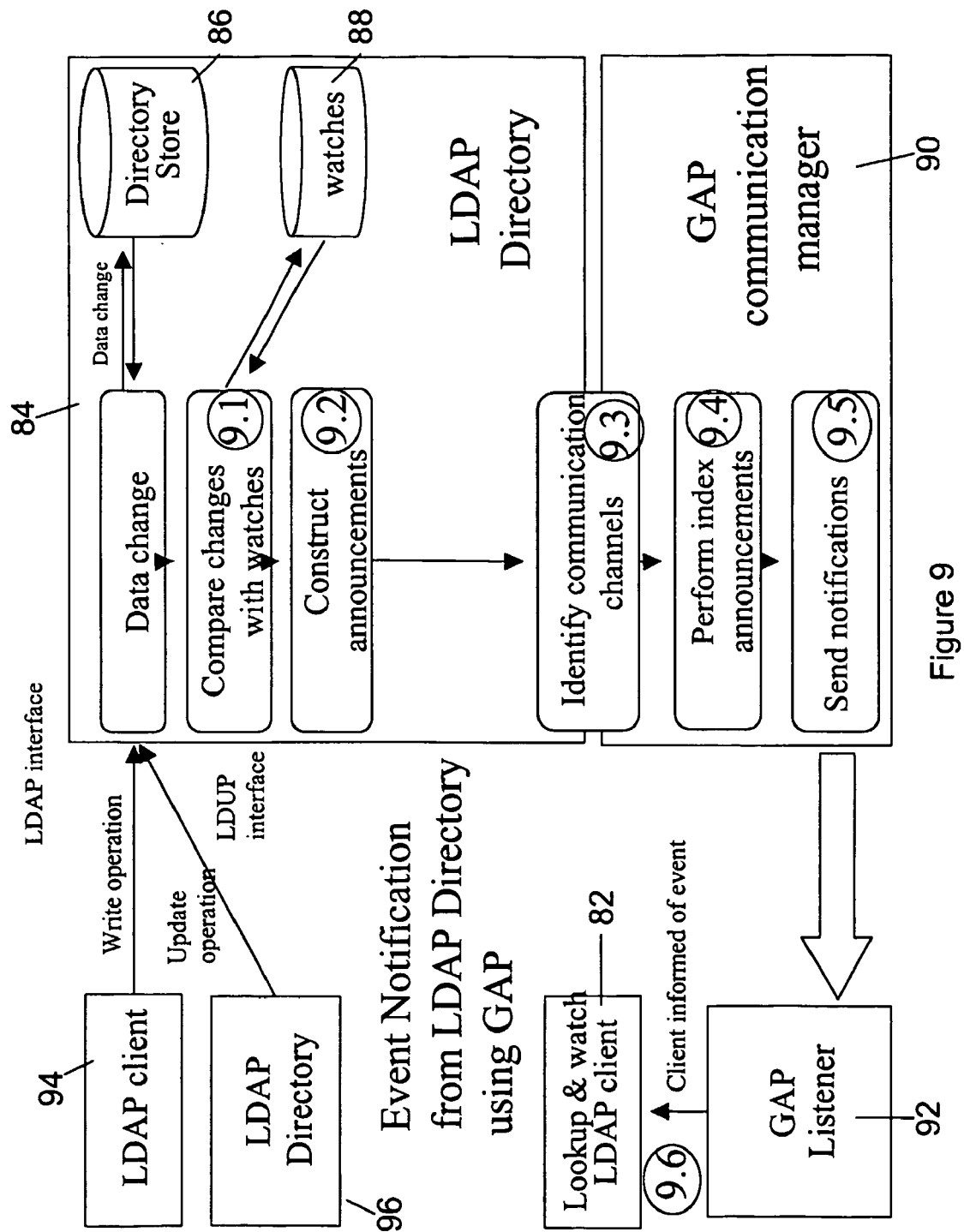
FIG. 9 is a block diagram showing the components and actions taken by the third specific embodiment upon the occurrence of a change event.

FIG. 9 illustrates the steps taken in the third embodiment of the invention when some of the data stored in the directory store 86 changes.

Assume that either an LDAP client application 94 performs a write operation to the LDAP directory 84 maintained at the event server, or the LDAP directory is somehow otherwise updated such that some of the data held therein is changed. The change is of course stored in the directory store 86, but is also used to initiate an event announcement to all interested parties announcing the change. This is achieved as follows.

At step 9.1 the LDAP server compares the data state identity with the contents of the watch store 88 to determine whether there are any maintained watches. Upon either an LDAP write from a client to the directory, or an LDUP replication from another directory, the server must compare the information changes to the directory with the maintained watches. Assuming that the LDAP directory maintains watches upon directory objects distinguished by their DN, then objects being changed or deleted, or objects having additional children added, are compared to the list of DNs on which watches are set.

Following this, at step 9.2 the event announcement is constructed if required (there is clearly no point in making an announcement if there are no registered watches). For each DN changed with an associated watch, a message is constructed explaining how that object has changed. A structured form of XML can be used to explain changes to the attributes of the object, or children created under it.

Having constructed the announcement, at step 9.3 the communication channels which must be used for event notification of the event are identified. When using GAP, for each announcement the server (in conjunction with the GAP communication manager) must identify the associated GAP Announcement Thread ID (AThID) and multicast channel onto which the event notification is going to be made.

Next, at step 9.4, the LDAP server performs any necessary management activities, and in particular the server (or the GAP communication manager) must ensure that the index announcements are made to inform clients that the event notification announcement is pending.

Then, at step 9.5, the notification messages are broadcast onto the idenitifed multicast channel, and including the appropriate AThID and version number for the data which has been changed. The GAP layer then provides a shared listener that actually retrieves the announcement on behalf of a end client application, as described in our earlier co-pending patent application referenced earlier.

The above describes the necessary steps required to have the event announced. The announcement itself is listened to by the GAP listener, who then accesses the appropriate information channel (in the case of an indexed GAP implementation) to retrieve the actual new state of the data for which the announcement has been made. This new state (value or otherwise) is then passed to the LDAP client 82.

What is claimed is:

1. A method for notifying one or more users of a present state of at least one property of an entity, the method comprising:
   a) receiving a request message from a user over a first communications channel, the message containing information indicating at least one property of an entity in which the user is interested;
   b) determining the present state of said at least one property;
   c) determining an identifier of at least one second communications channel onto which future messages containing information relating to future changes of state of the at least one property of the entity will be transmitted; and
   d) transmitting a reply message to the user, the reply message containing information indicative of the present state of the at least one property and of an identifier for each second communications channel;
   wherein the determining in c) further comprises:
   mapping the requested property to at least one communications channel onto which future messages which indirectly relate to the state of the property will be transmitted; and
   wherein an identity of the at least one communications channel is used as the identifier.

2. A method for notifying one or more users of a present state of at least one property of an entity, the method comprising:
   a) receiving a request message from a user over a first communications channel, the message containing information indicating at least one property of an entity in which the user is interested;
   b) determining the present state of said at least one property;
   c) determining an identifier of at least one second communications channel onto which future messages containing information relating to future changes of state of the at least one property of the entity will be transmitted; and
   d) transmitting a reply message to the user, the reply message containing information indicative of the present state of the at least one property and of an identifier for each second communications channel;
   wherein the determining in (c) further comprises:
   checking whether the requested property has been previously requested by any user; and either
   allocating a new identifier for the second communications channel if the property has not been requested previously; else
   if the property has been requested previously, using the identifier previously allocated as the second communications channel identifier.

3. A method according to claim 2, wherein the determining step c) further comprises:
   mapping the requested property to a communications channel onto which future messages which directly relate to the state of the property that will be transmitted; wherein the identity of the communications channel is used as the identifier.

4. A method according to claim 2, wherein the second communications channel is an index channel, and the future messages to be transmitted thereon are index messages containing information relating to the identity of at least one further communications channel on which further messages relating to changes of state of the property are to be transmitted.

5. A method according to claim 2, wherein the identifier of the second communications channel is an internet protocol multicast address.

6. A method according to claim 2, wherein the determining in b) further comprises:
   storing data relating to at least one property of at least one entity in a data store; and
   searching the stored data to match the property indicated by the received message with at least one stored property if possible;
   wherein if a match is found, the present state of the at least one matched stored property is determined as the present state of the requested property, else if no match is found, a null value is determined as the present state of the requested property.

7. A method according to claim 6, wherein the null value is included in the reply message to the client as the present state of the requested property.

8. A non-transitory computer readable storage medium storing a computer program which when executed on a computer causes the computer to operate in accordance with the method of claim 2.

9. A computer system comprising a non-transitory computer readable storage medium according to claim 8.

10. A system for notifying one or more users of a present state of at least one property of an entity, said system comprising:
   a) a message receiver for receiving a request message from a user over a first communications channel, the message containing information indicating at least one property of an entity in which the user is interested;
   b) a processor arranged in use to:
      i) determine the present state of said at least one property; and
      ii) determine an identifier of at least one second communications channel onto which future messages containing information relating to future changes of state of the at least one property of the entity will be transmitted; and
   c) a message transmitter arranged in use to transmit a reply message to the user, the reply message containing information indicative of the present state of the at least one property and of an identifier of each second communications channel;
   wherein the processor is further arranged in use to:
   iii) map the requested property to at least one communications channel onto which future messages which indirectly relate to the state of the property will be transmitted; and
   wherein identity of each at least one communications channel is used as its identifier.

11. A system for notifying one or more users of a present state of at least one property of an entity, said system comprising:
   a) a message receiver for receiving a request message from a user over a first communications channel, the message containing information indicating at least one property of an entity in which the user is interested;
   b) a processor arranged in use to:
      i) determine the present state of said at least one property; and
      ii) determine an identifier of at least one second communications channel onto which future messages containing information relating to future changes of state of the at least one property of the entity will be transmitted; and
   c) a message transmitter arranged in use to transmit a reply message to the user, the reply message containing information indicative of the present state of the at least one property and of an identifier of each second communications channel;
   wherein the processor is further arranged in use to:
      check whether the requested property has been previously requested by any user; and
      either allocate a new identifier for the second communications channel if the property has not been requested previously; else
      if the property has been requested previously, use the identifier previously allocated as the second communications channel identifier.

12. A system according to claim 11, wherein the processor is further arranged in use to:
   map the requested property to a communications channel onto which future messages which directly relate to the state of the property will be transmitted;
   wherein the identity of the communications channel is used as the identifier.

13. A system according to claim 11, wherein the second communications channel is an index channel, and the future messages to be transmitted thereon are index messages containing information relating to the identity of at least one further communications channel on which further messages relating to changes of state of the property are to be transmitted.

14. A system according to claim 11, wherein the identifier of the second communications channel is an internet protocol multicast address.

15. A system according to claim 11, wherein the processor is further arranged in use to:
   store data relating to at least one property of at least one entity in a data store; and
   search the stored data to match the property indicated by the received message with at least one stored property if possible;
   wherein if a match is found the present state of the at least one matched stored property is determined as the present state of the requested property, else if no match is found a null value is determined as the present state of the requested property.

16. A system according to claim 15, wherein the null value is included in the reply message to the client as the present state of the requested property.

* * * * *